United States Patent Office

Re. 28,065
Reissued July 2, 1974

28,065

METHOD FOR REDUCING RESIDUAL VINYL ACETATE MONOMER

Aleksander Beresniewicz and William Haworth Todd, Wilmington, Del., assignors to E. I. du Pont de Nemours and Company, Wilmington, Del.

No Drawing. Original No. 3,534,009, dated Oct. 13, 1970, Ser. No. 795,057, Jan. 29, 1969. Application for reissue Oct. 13, 1972, Ser. No. 297,037

Int. Cl. C08f *1/96*

U.S. Cl. 260—87.3 17 Claims

Matter enclosed in heavy brackets [ ] appears in the original patent but forms no part of this reissue specification; matter printed in italics indicates the additions made by reissue.

ABSTRACT OF THE DISCLOSURE

In the process of copolymerizing vinyl acetate and ethylene under low pressures of 100–3000 p.s.i., the residual vinyl acetate monomer after the main copolymerization is lowered to less than 0.35 percent by reducing the pressure (to atmospheric) and providing free radicals to the system containing the residual monomer. The free radicals are preferably provided from a chemical initiator such as a peroxide.

BACKGROUND OF THE INVENTION

Available methods for the batch copolymerization of vinyl acetate and ethylene to form copolymers with 50–95 percent vinyl acetate usually involve two steps; a main free-radical initiated polymerization step wherein a major portion of the vinyl acetate to be included in the copolymer is copolymerized with ethylene under ethylene pressures of about 100–3000 p.s.i., and a finishing step wherein residual vinyl acetate monomer is removed from the system containing the prepared copolymer. The finishing step is ordinarily accomplished by physically removing the monomer, e.g., by steaming or a nitrogen purge, or by chemically reacting the residual monomer, e.g., continuing the main polymerization until the residual monomer is exhausted. Physical removal of the residual monomer is cumbersome since additional equipment and processing steps are required. On the other hand, continuing the main polymerization is undesirable since an extraordinarily long polymerization time is required to reduce the residual monomer to an acceptable level [, i.e., less than about 0.35 weight percent, based on the copolymer]. In this respect, it is not unusual for the finishing step to take just as long as the main polymerization. Thus, heretofore, there has been no way to remove residual vinyl acetate monomer from the vinyl acetate/ethylene polymerization system in a completely satisfactory manner.

SUMMARY OF THE INVENTION

Now, however, there is provided an improved method for accomplishing the finishing step in the process of copolymerizing vinyl acetate and ethylene. According to the present invention, the finishing step is accomplished by a process which comprises reducing the pressure in the system containing the vinyl acetate/ethylene copolymer and the residual monomer to a value substantially below that at which the main polymerization is accomplished and, while under such reduced pressure, providing sufficient polymerization initiating free radicals to the system to reduce the residual vinyl acetate monomer content *below the level at the termination of the main copolymerization step* [to an amount of less than 0.35 percent, based on the weight of the vinyl acetate/ethylene copolymer in the system]. The present finishing process is especially suitable to systems wherein the vinyl acetate/ethylene copolymer is in the form of small particles dispersed in an aqueous medium, i.e., the system is a vinyl acetate/ethylene copolymer dispersion. Among other applications, such dispersions are generally useful as paints, paper coatings, and adhesives where residual monomer content and its attendant odor is particularly obnoxious.

DESCRIPTION OF PREFERRED EMBODIMENTS

Many patents and publications describe processes for preparing vinyl acetate-ethylene copolymers. Among others, the patents include U.S. Pats. 3,337,482 (Watanabe) and 3,355,322 (Worrall) as well as the following foreign patents: German 1,127,085 (Hoechst) and 1,226,382 (Badische); and Netherlands 66,04289 (Cumberland Chem.). In general, the known prior art processes are useful in preparing the vinyl acetate/ethylene copolymer systems which can be subsequently finished by the process of the present invention. The copolymers prepared by known processes usually contain 50–95 weight percent copolymerized vinyl acetate; the process for their preparation ordinarily involving free-radical initiated copolymerization at a temperature of 30–150° C. and a pressure of 100–3000 p.s.i. Also, while most of the known processes are concerned with aqueous emulsion polymerization systems, the finishing step of the present invention is equally applicable to vinyl acetate/ethylene copolymers prepared in solutions.

Since the copolymerization of vinyl acetate and ethylene is exothermic, a substantial cessation of the reaction exotherm indicates the termination of the main polymerization step. Ordinarily, at this time about 3 to as much as about 8 weight percent residual vinyl acetate monomer, based on the copolymer weight and determined by titration with bromine, remains in the system. It is at this time that the finishing step is accomplished. The finishing step of this invention involves, as an initial operation, reducing the pressure in the system containing the copolymer prepared in the main step. Any pressure reduction below that of the main polymerization permits easier removal of residual monomer. However, the finishing process becomes more efficient, i.e., takes progressively less time to reach a given monomer level, as the magnitude of the pressure reduction increases. Ordinarily, the pressure reduction is substantially below, i.e., to about 50 p.s.i., that of the main copolymerization and, preferably, to that of the atmosphere. If vacuum equipment is available, greater pressure reductions can be used though no added advantages are thought to result.

In accomplishing the pressure reduction of the finishing step, it is particularly advantageous to agitate the system, e.g., stirring during pressure let down or by transferring the system from the polymerizing vessel to another vessel at lower pressure. With sufficient agitation, it is possible to blow out some of the residual monomer thus shortening the total time necessary for the finishing step.

In addition to the above-discussed pressure reduction, the finishing step of the present invention includes providing sufficient polymerization initiating free radicals to the system, while it is in the reduced pressure state, to reduce the residual vinyl acetate monomer content *below the level at the termination of the main copolymerization step* [to an amount of less than 0.35 percent, based on the weight of the copolymer in the system. Preferably, the reduction is to less than 0.25 percent]. While not known with certainty, it is thought that residual vinyl acetate monomer reduction occurs either by grafting or homopolymerization. If sufficient dissolved ethylene remains, copolymerization can also occur. The essential factor with respect to the free radicals is that they be present when the system is under a pressure lower than that at which main polymerization is accomplished.

Ordinarily, the finishing step of the present invention is accomplished immediately after the main polymerization step. However, it can be delayed for any amount of time by simply not providing the system with sufficient free radicals until it is desired to finish the polymerization. Thus, polymerization finishing according to the present invention can be accomplished by providing the system with polymerization initiating free radicals at any time after the main polymerization and the pressure reduction.

The source providing the polymerization initiating free radicals is not especially important. Free radicals can be provided from chemical initiators or through irradiative techniques. With respect to chemical initiators, any of those known in the art can be used. Reference is made to the text "Fundamental Principles of Polymerization" by G. F. D'Alelio (John Wiley & Sons, Inc., New York 1952) for a description of many useful initiators. Among others, useful initiators include peroxides such as hydrogen peroxide, benzoyl peroxide, halogen substituted benzoyl peroxides, tertiary butyl hydroperoxide, etc.; and persulfates and perborates such as the ammonium, sodium, or potassium salts.

The creation of the polymerization initiating free radicals useful in the present process from the above initiators, i.e., activation of the initiators, can be accomplished by any of the well-known techniques. The initiators can be activated either by temperature, e.g., with persulfates at about 80° C., or through the action of a reducing agent. This latter method, customarily termed redox, is particularly suitable for use in the present invention since generation of the free radicals occurs at low temperatures, for example at room temperature or even below. Many suitable reducing agents for use in a redox method are set forth in U.S. Pat. 2,703,794 (Roedel) and include, among others, bisulfites, sulfoxylates, ferrous salts and tertiary aromatic amines. A hydrogen peroxide-zinc formaldehyde sulfoxylate redox system is especially preferred.

The manner in which the chemical initiators which provide the polymerization initiating free radicals are introduced into the system is not particularly important. For example, if excess quantities of initiators are present in the system during the main polymerization, some of the initiator may be present in the system after the pressure reduction. The residual vinyl acetate monomer can then be removed by activating the remaining initiator. On the other hand, initiator can be added to the reaction system after the ethylene pressure has been reduced.

Free radicals must be provided to the system in an amount sufficient to reduce the residual vinyl acetate monomer content *below the level at the termination of the main copolymerization step* [to below 0.35 weight percent]. The appropriate quantity of initiator which must be present to provide the necessary free radicals depends on the amount of residual monomer to be *removed* [remoxed] as well as the finishing conditions. For a give residual monomer level, finishing at high temperatures e.g., above 90° C. with an initiator such as a persulfate or above 30° C. with a redox system, requires more initiator than low temperature finishing. On the other hand, the finishing time required at high temperatures is less than that at low temperatures. Thus, the amount of initiator provided to the system depends on how fast a finishing time is desired. Ordinarily, [residual monomer levels of 3–8 weight percent] the presence, under activating conditions, of at least $5\times10^{-5}$ mole, preferably above $10^{-4}$ mole, of chemical initiator per 100 grams of copolymer will provide sufficient free radicals to reduce the residual monomer *content over 12–32 fold* [to below 0.25 percent] in an economically feasible time, e.g., about 20–50 minutes.

In accomplishing thhe present finishing step, conditions should be avoided which tend to inhibit the creation of free radicals. For example, since polymerization of vinyl acetate is strongly inhibited by oxygen, the finishing step should be carried out under an atmosphere other than air, e.g. nitrogen or ethylene. The pH of an aqueous dispersion system further illustrates a potentially adverse condition. Basic conditions seem to inhibit free radical formation in a hydrogen peroxide-zinc formaldehyde sulfoxylate reduc initiator system. Accordingly, acid conditions should be employed with this initiator system. On the other hand, persulfate initiators can be used to provide free radicals when the system is basic.

Subject to the above paragraph, a variety of ingredients other than the copolymer can be present in the system during the finishing step. Thus, if the copolymer is prepared in an aqueous dispersion or suspension, ingredients such as surfactants, thickeners, protective colloids, buffers, etc. will frequently be present. If solution polymerization techniques are employed, diluents or solvents can be present. Similarly, while the present invention has been thus far discussed in terms of vinyl acetate/ethylene binary copolymers, it is also applicable in the preparation of vinyl acetate/ethylene copolymers containing minor amounts of one or more other copolymerizable monomers. Thus, unsaturated carboxylic acids such as acrylic and methacrylic acid as well as other derivatives, for example, substituted or unsubstituted esters of such acids, as well as other vinyl compounds, e.g., vinyl chloride, vinyl fluoride, etc. can be included in the vinyl acetate/ethylene copolymers contained in the system finished by the present process.

The present process is particularly useful in finishing systems wherein the vinyl acetate/ethylene copolymer contains a post reactive copolymerized monomer, e.g., glycidylacrylate, *allyl*[alkyl] glycidyl ether, triallyl cyanurate, N-methylol acrylamide, etc. Since the present finishing process can be accomplished at low temperatures, the chance that the post reactive monomer will prematurely react is diminished.

The following example illustrates the present invention. All parts are by weight unless otherwise indicated

EXAMPLE

The following ingredients are charged into a stirred 5 gallon pressure vessel:

| | Grams |
|---|---|
| Vinyl acetate | 45–50 |
| 10% aqueous solution of Elvanol® 51–05 polyvinyl alcohol (88% hydrolyzed—low viscosity) | 2700 |
| Water | 2000 |
| 3% aqueous solution of zinc-formaldehyde sulfoxylate | 200 |

After closing the vessel and purging it with nitrogen, the contents are heated to 60° C. under an ethylene pressure of 600 p.s.i. Copolymerization of the ethylene and vinyl acetate is then initiated by adding to the vessel 30 grams of an initiator solution of 0.6% hydrogen peroxide dissolved in water.

When polymerization starts, as indicated by the observance of an exotherm, the separate continuous feeds indicated below are added to the vessel at a uniform rate over a period of 2 hours.

Feed 1 (comonomer)

| | Grams |
|---|---|
| Vinyl acetate | 3160 |

Feed 2

| | |
|---|---|
| 10% aqueous solution of Elvanol® 51–05 polyvinyl alcohol (88% hydrolyzed—low viscosity) | 1800 |
| 3% aqueous solution of zinc-formaldehyde sulfoxylate solution in water | 270 |
| Water | 200 |
| Aerosol® MA–80 (sodium dihexylsulfosuccinate) | 110 |

Ethylene pressure is maintained at 600 p.s.i., and, by addition of initiator solution, the polymerization temperature is maintained at 60° C. The reaction exotherm dies down after about 4 hours, at which time the ethylene pressure is reduced to atmospheric. At this point, the residual monomer content is about 3%. Thereafter, 100 grams of the above-designated initiator solution are added to the emulsion. After maintaining the emulsion for about 30 minutes at 40° C., the residual vinyl acetate monomer content is *reduced by more than 85%* [less than 0.35 percent, based on the weight of the copolymer].

In comparison, if the ethylene pressure is not reduced after the exotherm subsides or if additional initiator is not added to the reduced pressure system, an additional 30 minutes of reaction time reduces the monomer content *only by about 17 percent* [to only about 2.5 percent, based on the weight of the copolymer].

I claim:

1. In the process of preparing a copolymer system containing a vinyl acetate/ethylene copolymer having 50–95 weight percent copolymerized vinyl acetate and a small level of residual vinyl acetate monomer comprising a main copolymerization step wherein a *major portion of the vinyl acetate to be included in the copolymer* [quantity of vinyl acetate] is copolymerized with ethylene at a temperature of about 30–150° C. and under an ethylene pressure of about 100–3000 p.s.i. *until a substantial cessation of the reaction exotherm indicates the termination of the main copolymerization step* [to an extent such that at least 0.35 percent residual vinyl acetate monomer, based on the weight of vinyl acetate/ethylene copolymer in the system, remains in the system] and a finishing step wherein the residual vinyl acetate monomer content in the system is *further* reduced [to a level below 0.35 percent;] the improvement comprising, accomplishing the finishing step by reducing the pressure in the system to a value substantially below that at which the main copolymerization was accomplished and, while the system is under such reduced pressure, providing sufficient polymerization initiating free radicals to the system to reduce the residual vinyl acetate monomer content *below the level at the termination of the main copolymerization step* [to an amount of less than 0.35 percent].

2. The process of claim 1 wherein the pressure reduction in the finishing step is to about that of atmospheric pressure.

3. The process of claim 2 wherein the copolymer system is an aqueous dispersion.

4. The process of claim 3 wherein, in the finishing step, polymerization initiating free radicals are provided by activating a chemical initiator.

5. The process of claim 4 wherein the chemical initiator is a peroxide.

6. The process of claim 5 wherein the peroxide is activated by a reducing agent.

7. The process of claim 6 wherein the peroxide is hydrogen peroxide and the reducing agent is zinc formaldehyde sulfoxylate.

8. The process of claim 4 wherein [3–8 weight percent, residual vinyl acetate monomer remains in the system after the main copolymerization step and wherein] at least $5 \times 10^{-5}$ mole of chemical initiator per 100 grams of copolymer is provided to the system during the finishing step.

9. The process of claim 8 wherein the chemical initiator is a peroxide.

10. The process of claim 9 wherein the peroxide is activated by a reducing agent.

11. The process of claim 10 wherein the peroxide is hydrogen peroxide and the reducing agent is zinc-formaldehyde sulfoxylate.

12. The process of claim 2 wherein the residual vinyl acetate monomer content is reduced *by more than 85 percent during the finishing step* [to below 0.25 percent].

13. The process of claim 12 wherein the copolymer system is an aqueous dispersion.

14. The process of claim 13 wherein, in the finishing step, polymerization initiating free radicals are provided by activating a chemical initiator.

15. The process of claim 14 wherein the chemical initiator is a peroxide.

16. The process of claim 15 wherein the peroxide is activated by a reducing agent.

17. The process of claim 16 wherein the peroxide is hydrogen peroxide and the reducing agent is zinc-formaldehyde sulfoxylate.

References Cited

The following references, cited by the Examiner, are of record in the patented file of this patent or the original patent.

UNITED STATES PATENTS

| | | | |
|---|---|---|---|
| 2,656,334 | 10/1953 | D'Alelio | 260—47 |
| 3,414,547 | 12/1968 | Thompson et al. | 260—78.5 |
| 3,509,115 | 4/1970 | French | 260—87.3 |

JOSEPH L. SCHOFER, Primary Examiner

J. KIGHT III, Assistant Examiner